(12) United States Patent
Noh et al.

(10) Patent No.: US 9,865,100 B2
(45) Date of Patent: Jan. 9, 2018

(54) FAILURE DETECTION APPARATUS OF MOTOR DRIVE POWER SYSTEM AND METHOD OF THE SAME

(71) Applicant: Hyundai Motor Company, Seoul (KR)

(72) Inventors: Yoon Kab Noh, Seongnam-si (KR); Jong Ho Lee, Incheon (KR); Yang Soo Noh, Hwaseong-si (KR); Min Woo Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 62 days.

(21) Appl. No.: 14/958,633

(22) Filed: Dec. 3, 2015

(65) Prior Publication Data
US 2016/0371898 A1    Dec. 22, 2016

(30) Foreign Application Priority Data
Jun. 16, 2015   (KR) .................. 10-2015-0084847

(51) Int. Cl.
*G07C 5/08* (2006.01)
*G07C 5/02* (2006.01)

(52) U.S. Cl.
CPC ............. *G07C 5/0808* (2013.01); *G07C 5/02* (2013.01)

(58) Field of Classification Search
CPC ............................ G07C 5/02; G07C 5/0808
USPC ................................ 701/33.4–33.9
See application file for complete search history.

(56) References Cited

U.S. PATENT DOCUMENTS

2015/0175193 A1*   6/2015   Endo .................... B62D 5/0487
                                                   701/29.2

FOREIGN PATENT DOCUMENTS

| JP | 2008-307910 A | 12/2008 |
|----|----|----|
| JP | 2009-143370 A | 7/2009 |
| JP | 2010-58688 A | 3/2010 |
| KR | 10-2009-0027494 A | 3/2009 |
| KR | 10-2013-0033188 A | 4/2013 |
| KR | 10-2014-0026763 A | 3/2014 |
| KR | 10-1449324 B1 | 10/2014 |
| KR | 10-2015-0007486 A | 1/2015 |

* cited by examiner

*Primary Examiner* — Nga X Nguyen
(74) *Attorney, Agent, or Firm* — Morgan, Lewis & Bockius LLP

(57) ABSTRACT

A failure detection apparatus and method of the MDPS may include a configuration that determines a failure of the MDPS in accordance with a vehicle speed, a steering torque, steering angle, a motor torque, and an estimated yaw rate, and when it is determined that the MDPS breaks down, additionally determines the type of failure.

10 Claims, 6 Drawing Sheets

- OVER-STEERING DETECTION SIMULATION RESULT [VEHICLE DATA-BASED OFF-LINE SIMULATION] -

FAILURE DETECTION APPARATUS OF MOTOR DRIVE POWER SYSTEM AND METHOD OF THE SAME

CROSS-REFERENCE TO RELATED APPLICATION

The present application claims priority to Korean Patent Application No. 10-2015-0084847 filed on Jun. 16, 2015, the entire contents of which is incorporated herein for all purposes by this reference.

BACKGROUND

Field of the Invention

The present disclosure relates to a failure detection apparatus of a Motor Drive Power System (MDPS). More particularly, the present disclosure relates to a detection apparatus and detection method to determine the failure and the type of failure of the MDPS by monitoring the whole state of a vehicle.

Description of Related Art

As in-vehicle parts are digitalized, concerns over the functional safety of a vehicle increase, and International Standards ISO26262 about the functional safety of a vehicle is drawing attention from vehicle-related manufacturers.

In regard to a Motor Drive Power System (MDPS), more efforts to provide a steering apparatus meeting ISO26262 have been made. As limitations that may occur in the MDPS, there are over steering and wrong direction. Over steering refers to a phenomenon that the vehicle body excessively turns compared to the steering angle, and denotes a phenomenon that can occur when the rear wheel loses a grip force by sliding outwards. Also, wrong direction refers to a phenomenon that the vehicle body travels in a different direction from the steering angle of a steering wheel, and denotes a phenomenon that a vehicle runs in a different turning direction from a request of a driver.

FIGS. 1 and 2 show over-steering and wrong direction during the turning of a vehicle.

In the drawings, a vehicle starts to drive, and starts to turn. Also, when a failure occurs in the MDPS, a vehicle cannot normally turn a corner, and runs on an abnormal path.

Accordingly, when a failure occurs in the MDPS during driving, a vehicle cannot turn a corner according to a request of a user and spins out of a road inwards or outwards.

As a related art, Korean Patent Application No. 10-2012-0092310 (Hereinafter, referred to as Document 1) discloses a technology of securing straightness of a vehicle even when a rear wheel steering apparatus of a vehicle breaks down, by steering the front wheel of a vehicle in the same direction as the rear wheel using a front wheel steering apparatus of a vehicle.

However, since a technology of detecting a failure of an electronic steering apparatus of a vehicle in early stage and blocking application of a current to a motor to enable the manual operation of the steering apparatus is not disclosed in Document 1, the drivability of a vehicle cannot be maintained when the steering apparatus breaks down.

Also, the steering apparatus needs to be reset and reoperated due to the failure of the MDPS, and a method of preventing the occurrence of a failure is not provided.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and method of early detecting a failure of a Motor Drive Power System (MDPS) and to providing a technology capable of performing a fail-safe function without adding a separate function to the MDPS, by determining phenomenologically the whole state of a vehicle and determining whether the MDPS breaks down.

Various aspects of the present invention are directed to providing a method of enabling manual operation of the MDPS by blocking application of a current to a motor of the MDPS when a failure occurs in the MDPS.

Various aspects of the present invention are directed to providing a method of preventing occurrence of a failure by resetting and restarting the MDPS when the MDPS breaks down.

In one aspect, the present invention provides a failure detection method of a Motor Drive Power System (MDPS), including: determining whether or not a vehicle speed is equal to or larger than a first preset value when a vehicle turns; performing multiplication operation of a steering torque and a motor torque and determining whether or not an accumulation value calculated by an integral for a preset time is equal to or larger than a second preset value when the vehicle speed is equal to or larger than the first preset value; determining whether or not the motor torque is equal to or larger than a third preset value; determining a yaw rate change rate according to the vehicle speed and a steering angle and determining whether or not the yaw rate change rate is equal to or larger than a fourth preset value; and determining that the MDPS breaks down when the accumulation value is equal to or larger than the second preset value, when the motor torque is equal to or larger than the third preset value, and when the yaw rate change rate is equal to or larger than the fourth preset value, and determining that the MDPS normally operates when the accumulation value is not equal to or larger than the second preset value, when the motor torque is not equal to or larger than the third preset value, or when the yaw rate change rate is not equal to or larger than the fourth preset value.

In an exemplary embodiment, when it is determined that the MDPS breaks down, the failure detection method may further include determining the type of failure, wherein the determining of the type of failure includes: determining whether or not the signs of the steering angle and the yaw rate change rate are equal to each other; and determining that the failure of MDPS is over-steering when the signs of the steering angle and the yaw rate change rate are equal to each other, and determining that the failure of MDPS is wrong direction when the signs of the steering angle and the yaw rate change rate are not equal to each other.

In another exemplary embodiment, when it is determined that the MDPS breaks down, the failure detection method may further include blocking a current applied to a motor of the MDPS.

In still another exemplary embodiment, after the blocking of a current applied to the motor, the failure detection method may further include resetting and restarting the MDPS.

In yet another exemplary embodiment, the determining processes are sequentially repeated.

In still yet another exemplary embodiment, the failure detection method, in the determining of whether or not the vehicle speed is equal to or larger than the first preset value, may include determining turning of the vehicle using an input of the steering angle and the steering torque.

In a further exemplary embodiment, the yaw rate change rate may be calculated by estimating a yaw rate based on the input of the steering angle and the vehicle speed, differentiating the estimated yaw rate and using a low pass filter.

In another aspect, the present invention provides a failure detection apparatus of a Motor Drive Power System (MDPS), including: a prerequisite determination module determining according to a steering torque of a vehicle and an input of a steering angle whether or not the vehicle turns, and when a vehicle speed is equal to or larger than a first preset value, transmitting an order of determining whether or not the MDPS breaks down; and a failure determination module receiving the order of determining whether or not the MDPS breaks down from the prerequisite determination module to determine whether or not the MDPS breaks down, wherein the failure determination module includes: an integral-based detection module performing multiplication operation of the steering torque and a motor torque and determining whether or not an accumulation value calculated by integrating for a preset time is equal to or larger than a second preset value; a motor torque-based detection module determining whether or not the motor torque is equal to or larger than a third preset value; and a yaw rate change rate-based detection module determining a yaw rate change rate according to the vehicle speed and the steering angle and determining whether or not the yaw rate change rate is equal to or larger than a fourth preset value, and determines that the MDPS breaks down when conditions of the integral-based detection module, the motor torque-based detection module, and the yaw rate change rate-based detection module are all met.

In an exemplary embodiment, when the failure determination module determines that the MDPS breaks down, the failure detection apparatus may further include a failure type determination module determining whether or not the signs of the steering angle and the yaw rate change rate are equal to each other, determining that the failure of the MDPS is over-steering when the signs of the steering angle and the yaw rate change rate are equal to each other, and determining that the failure of the MDPS is wrong direction when the signs of the steering angle and the yaw rate change rate are not equal to each other.

In another exemplary embodiment, when the failure determination module determines that the MDPS breaks down, the failure detection apparatus may further include a motor control module blocking a current applied to a motor of the MDPS.

In still another exemplary embodiment, when the motor control module blocks a current applied to the motor of the MDPS, the failure detection apparatus may resets and restart the MDPS.

In yet another exemplary embodiment, the yaw rate change rate may be calculated by estimating a yaw rate based on the input of the steering angle and the vehicle speed, and by differentiating the estimated yaw rate to apply to a low pass filter.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
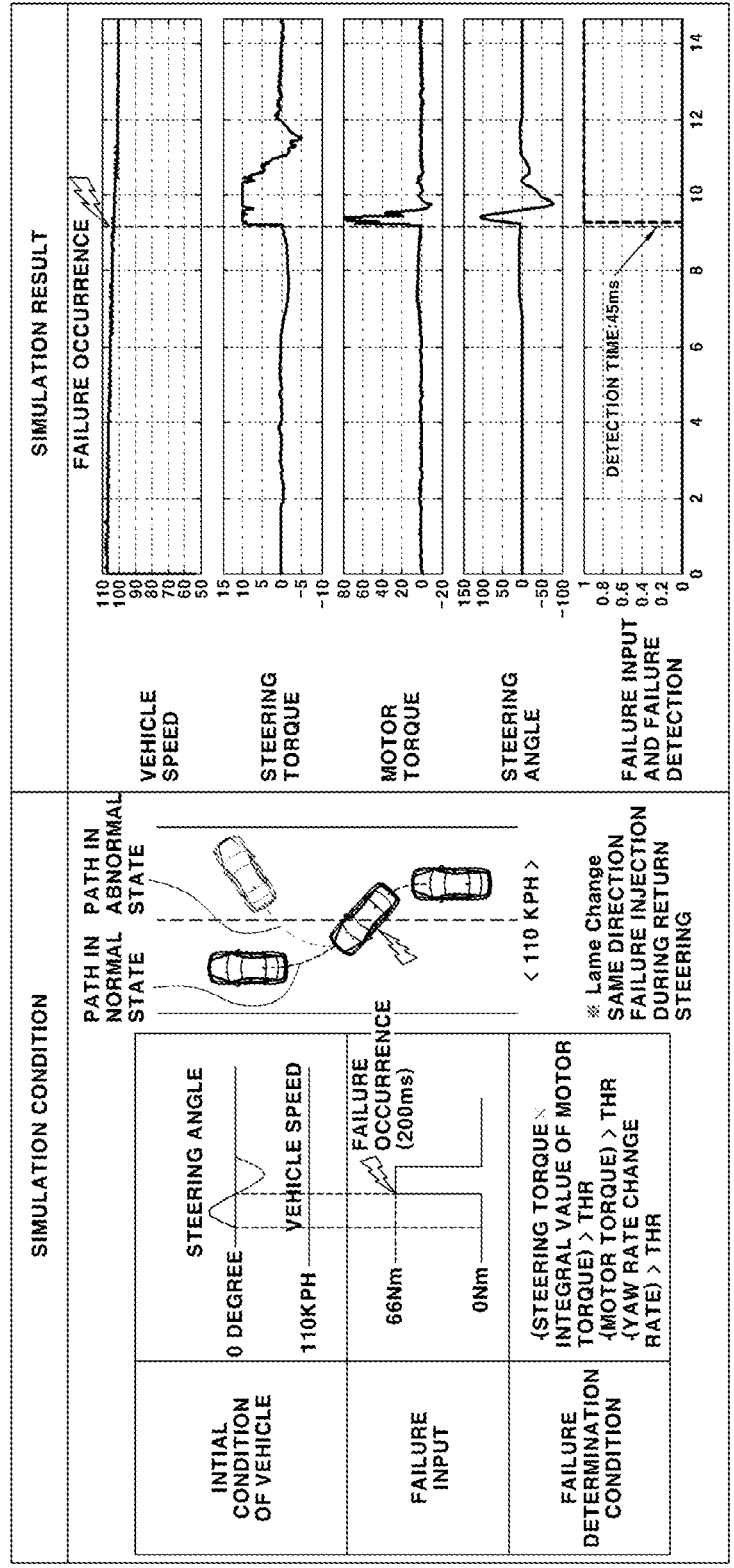
FIG. 1 is a view illustrating a over-steering simulation condition of a vehicle when a failure occurs in a Motor Drive Power System (MDPS)

Reference numerals set forth in the Drawings includes reference to the following elements as further discussed below:

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has at least two sources of power, for example both gasoline-powered and electric-powered vehicles.

The above and other features of the invention are discussed infra.

Hereinafter, exemplary embodiments of the present invention will be described in detail with reference to the accompanying drawings. Embodiments of the present invention can be modified into various forms, and the scope of the present invention should not be construed as being limited to the exemplary embodiments below. These embodiments are provided to more fully explain the present invention to those of ordinary skill in the art.

When a steering wheel of a Motor Drive Power System (MDPS) is operated during driving of a vehicle, a motor inside the MDPS may be driven according to the angle change or the torque change of the steering wheel, and thus the traveling direction of the vehicle can be changed. In the MDPS, when a driver operates the steering wheel gripped by the driver's hands, a torque sensor may sense the driver's operation, and an electronic control unit (ECU) gives an order corresponding to the steering direction and the torque of the steering wheel to the motor inside the MDPS. Accordingly, the motor may operate to move the axis of the front wheel of a vehicle, and thus the traveling direction of a vehicle may be changed.

However, such MDPS, which is a component directly related to the driving of a vehicle, may be directly related to safety. In recent years, the International Standards ISO26262 about the functional safety of a vehicle is drawing attention.

The present invention may provide a technology of analyzing the functions and failure of the MDPS satisfying the International Standards and early detecting a failure of the MDPS to prevent accidents.

Thus, the present invention provides a failure detection apparatus and detection method of the MDPS, and relates to the MDPS that performs motion of the front wheel axis corresponding to the steering wheel using the motor.

FIG. 1 is a view illustrating an over-steering simulation of a vehicle when a failure occurs in MDPS according to an exemplary embodiment of the present invention.

As shown in FIG. 1, when a driver tries to turn a vehicle, a motor torque may be generated in the same direction as the steering direction of the driver, and the vehicle body may excessively turn compared to the steering angle.

In the case of over-steering situation, since the rotating torque of the steering apparatus of a driver is constantly maintained and the motor torque is generated in the same direction as the steering direction of a driver, the steering torque of the driver and the motor torque may be generated in the same direction.

Figure 2:
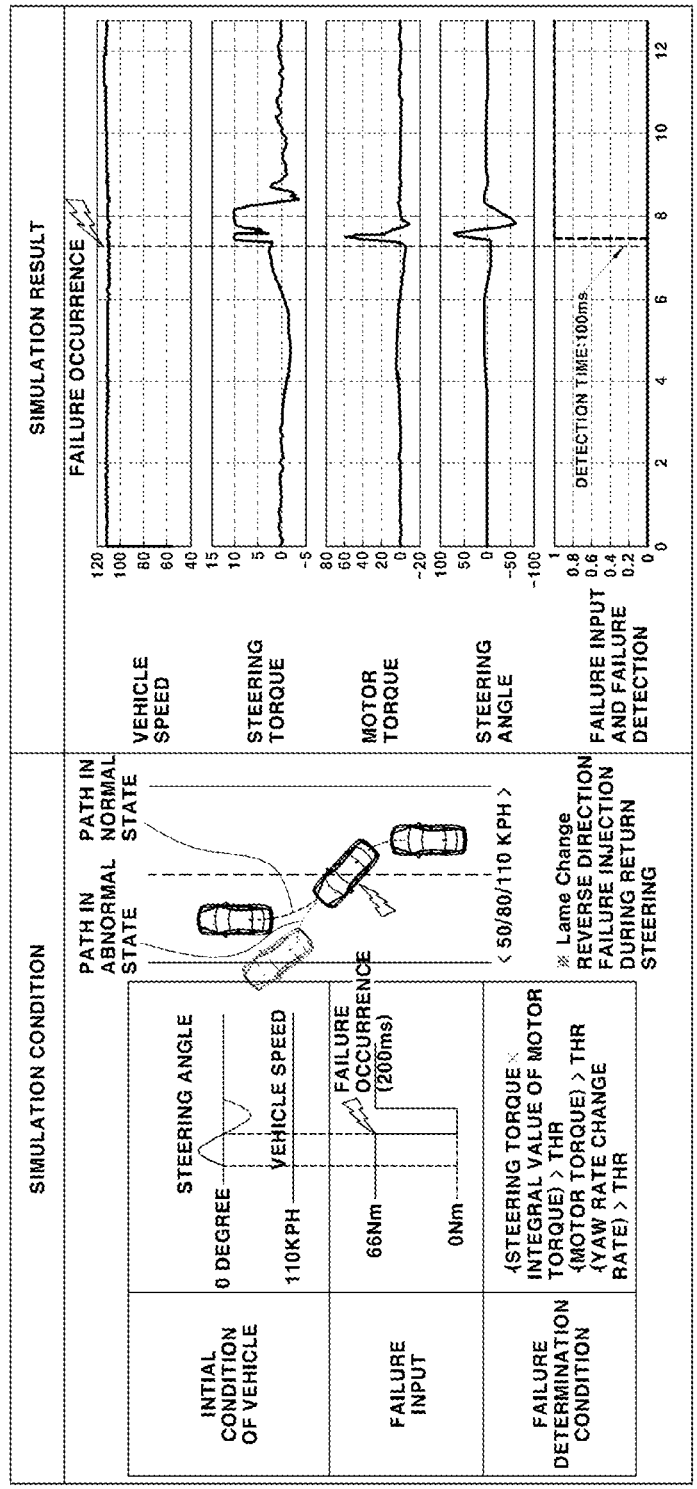
FIG. 2 is a view illustrating a wrong direction simulation condition of a vehicle when a failure occurs in an MDPS.

FIG. 2 shows a wrong direction simulation of a vehicle when a failure occurs in the MDPS according to an exemplary embodiment of the present invention.

Unlike the over-steering situation, the motor torque is generated in the opposite direction to the steering direction of a driver, the steering torque of the driver and the motor torque may be generated in the opposite directions to each other.

Figure 3:
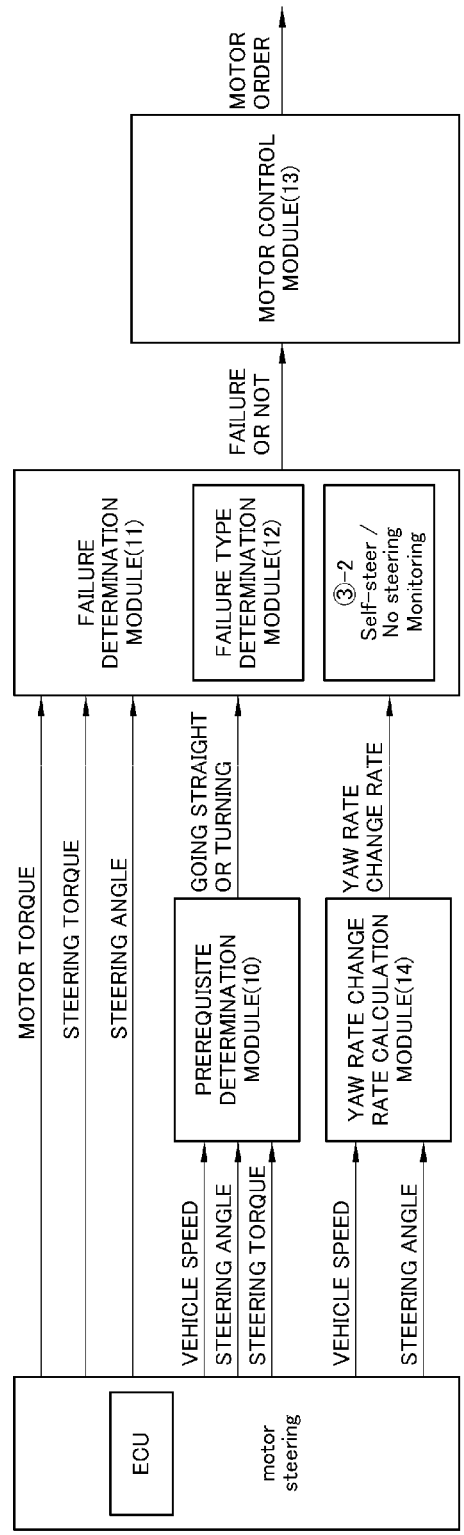
FIG. 3 is a block diagram illustrating a failure detection apparatus of an MDPS according to an exemplary embodiment of the present invention.

FIG. 3 is a view illustrating a failure detection apparatus of the MDPS according to an exemplary embodiment of the present invention.

Prior to determining a breakdown according to an exemplary embodiment of the present invention, a prerequisite determination module 10 may be configured to determine whether or not a vehicle turns and compare the vehicle speed with a preset value to determine whether or not the actual vehicle speed is larger than the preset value.

The turning driving of a vehicle may be determined by performing a detection logic according to the vehicle speed, the steering angle, and the steering torque. In addition, when it is determined that a vehicle performs turning driving, it is determined whether or not the vehicle speed is equal to or larger than a first preset value. When the vehicle speed of turning driving of a vehicle is equal to or larger than the first preset value, a failure determination order may be transmitted.

As described above, the first preset value may be randomly selected by determining the speed point where the failure detection of the MDPS of a vehicle needs to more sensitively work. Since the failure of the MDPS that can be ignored at a low speed driving may seriously affect driving safety at a high speed driving, failure detection sensitivity can be determined by adjusting the first preset value.

Figure 4:
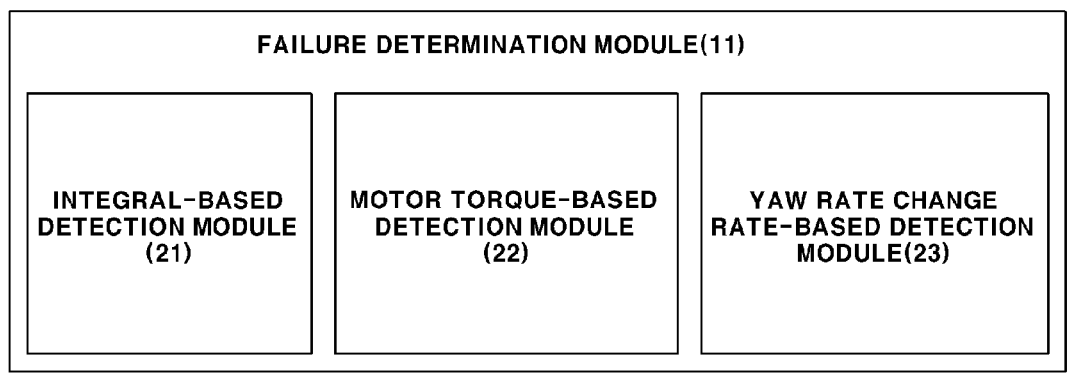
FIG. 4 is a block diagram illustrating modules constituting a failure determination module according to an exemplary embodiment of the present invention.

FIG. 4 is a block diagram illustrating the configuration of the failure determination module 11.

The failure determination module 11 that receives the failure determination order of a vehicle and determines a failure of the vehicle may include an integral-based detection module 21, a motor torque-based detection module 22, and a yaw rate change rate-based detection module 23. The integral-based detection module 21 may perform multiplication operation of the steering torque and the motor torque to determine whether or not an accumulation value integrated for a preset time is equal to or larger than a second preset value. The motor torque-based detection module 22 may determine whether or not the motor torque is equal to or larger than a third present value. The yaw rate change rate-based detection module 23 may determine whether or not the yaw rate change rate according to the vehicle speed and the steering angle is equal to or larger than a fourth preset value.

As described above, first, the failure determination module 11 may include the integral-based detection module 21. Generally, when the MDPS normally operates, the steering torque and the motor torque may have opposite signs to each other. However, when the MDPS breaks down, the steering torque and the motor torque may have the same signs.

Accordingly, the product of the steering torque and the motor torque may be calculated, and the calculated product of the steering torque and the motor torque may be integrated for a preset time to calculate an accumulation value. Thus, since the integral-based detection module 21 may perform integration of the product of the motor torque and the steering torque, the setting of detection time may be easy.

In this embodiment, it may be determined whether or not the calculated accumulation value is equal to or larger than the second preset value. When the calculated accumulation value is equal to or larger than the second preset value, it may be determined that the MDPS breaks down.

The reason why the failure of the MDPS is determined by comparing the accumulation value integrated for a certain time with the second preset value may be because when the MDPS immediately returns to a normal state even though a vehicle temporarily runs on a failure path during the operation of the MDPS, it is not necessary to take measures such as blocking of a current to the motor by determining that the MDPS breaks down.

However, since a vehicle continuously runs on the failure path for a certain time due to the failure of the MDPS when the accumulation value is equal to or larger than the second preset value, measures need to be taken. Accordingly, it may be determined that the MDPS breaks down, and a fail-safe process such as blocking of a current to the motor may be performed through a motor control module 13.

Second, the failure determination module 11 may further include the motor torque-based detection module 22. When the motor torque is equal to or larger than the third preset value, it may be determined that the MDPS breaks down.

As described above, when the motor torque is equal to or less than the third preset value, a difference between the traveling direction according to a driver's request and the turning direction of a vehicle is slight even when the MDPS of the vehicle breaks down. Accordingly, a separate fail-safe process is not required to be performed, and when the motor torque of the MDPS is equal to or larger than the third present value, it may be determined that the MDPS breaks down.

Third, the failure determination module 11 may further include the yaw rate change rate-based detection module 23. The integral-based detection module 21 according to an exemplary embodiment of the present invention may not use a yaw rate sensor, and may estimate and use a yaw rate value from the steering angle and the vehicle speed through a yaw rate change rate calculation module 14.

Thus, the present invention may not use information of a control system for a vehicle through the yaw rate sensor. Instead, a process of estimating a yaw rate from factors such as the steering angle and the vehicle speed of the vehicle and calculating the yaw rate change rate may be performed through the estimated yaw rate. When the calculated yaw rate change rate is equal to or larger than the fourth preset value, it may be determined that the MDPS breaks down.

As described above, the yaw rate change rate calculation module 14 may estimate the yaw rate from the factors such as the steering angle inputted into a vehicle and the vehicle speed. When the estimated yaw rate change rate is calculated, the whole state of the vehicle can be phenomenologically determined. That is, when the failure of the MDPS is determined using the yaw rate sensor, an immediate failure sensing may be difficult due to a delay of the yaw rate sensor itself. Accordingly, in this embodiment, since the yaw rate value is estimated based on the steering angle and the vehicle speed, it may be quickly sensed whether or not the MDPS breaks down according to the driving state of a vehicle.

The estimated yaw rate necessary to calculate the changed yaw rate can be estimated from the following Equation 1.

$$\text{Yaw Rate} = \frac{Vx}{L + \frac{KusVx^2}{g}} \times \delta f \qquad (1)$$

Here, Vx denotes the vehicle speed, L denotes the wheel base, Kus denotes the understeer constant, g denotes the gravity, and δf denotes the steering angle.

As described above, in detecting of the failure of the MDPS of a vehicle, when all conditions are met in regard to the integral-based detection module 21, the motor torque-based detection module 22, and the yaw rate change rate-based detection module 23, it may be determined that the MDPS breaks down.

Figure 5:
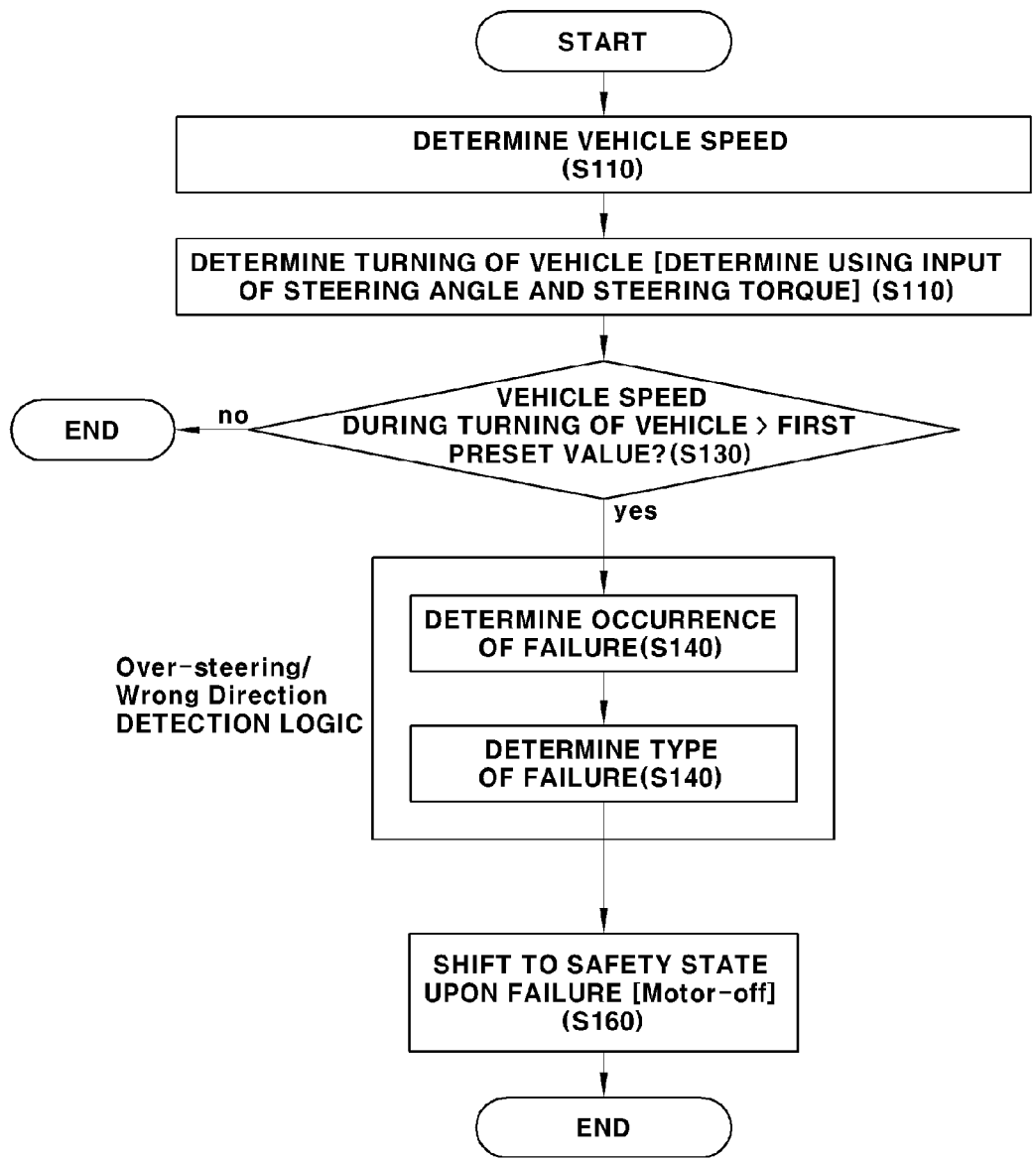
FIG. 5 is a flowchart illustrating a failure detection method of an MDPS according to an exemplary embodiment of the present invention.

FIG. 5 is a flowchart illustrating a failure detection method of the MDPS according to an exemplary embodiment of the present invention.

According to the failure detection method of the MDPS, the vehicle speed may be received (S110), and then turning of a vehicle may be determined (S120). In the determining of the turning of the vehicle, the steering angle that is inputted and the steering torque may be used. When it is determined that the vehicle turns, it may be determined whether or not the vehicle speed is equal to or larger than a first preset value (S130). When the vehicle speed is equal to or larger than the first preset value, it may be determined whether or not the MDPS breaks down (S140). Additionally, the type of failure may be determined through a failure type determination module 12 (S150), and when the vehicle speed is less than the first preset value, the logic may be finished.

When it is determined that the MDPS breaks down through the determining of whether or not the MDPS breaks down, a fail-safe logic may be applied to perform a safety state mode upon failure, and a current applied to the motor may be cut off (S160). Since the motor to which a current is not supplied is reset and restarted, it may also be ensured that the MDPS correctly operates.

Figure 6:
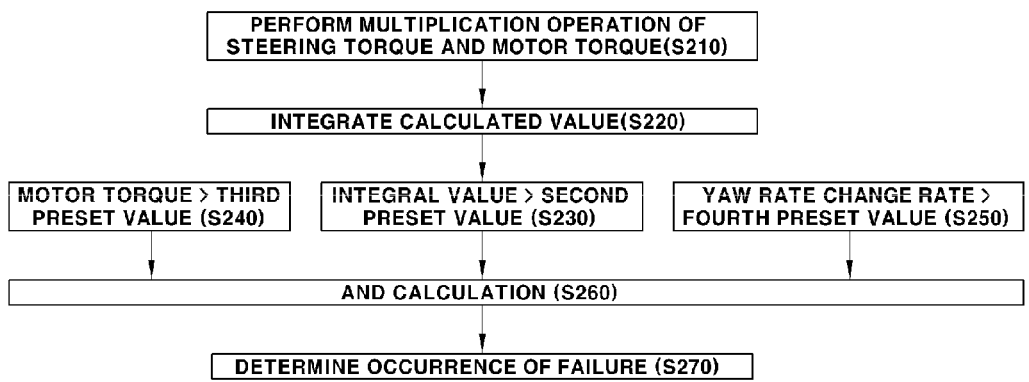
FIG. 6 is a flowchart illustrating failure determination using a failure detection method of an MDPS according to an exemplary embodiment of the present invention.

In FIG. 6, in the performing of failure determination, the multiplication operation of the steering torque and the motor torque may be performed (S210), and the accumulation value may be calculated by integrating the calculated value for a preset time (S220). Thereafter, it may be determined whether or not the accumulation value is equal to or larger than the second preset value (S230). The integration may be performed through the integral-based detection module 21.

Furthermore, simultaneously with the integral calculation process, it may be determined whether or not the motor torque is equal to or larger than the third present value (S240), and the yaw rate change rate may be determined in accordance with the vehicle speed and the steering angle to determine whether or not the yaw rate change rate is equal to or larger than the fourth preset value (S250).

The calculation of the motor torque may be performed through the motor torque-based detection module 22, and the determining of the yaw rate change rate according to the vehicle speed and the steering angle may be performed through the yaw rate change rate-based detection module 23.

Furthermore, the yaw rate of a vehicle may be estimated to calculate the yaw rate change rate, and the yaw rate may be estimated in accordance with the vehicle speed and the steering angle. The yaw rate change rate may be performed through the yaw rate change rate calculation module 14.

As described above, when the motor torque condition, the integral accumulation value condition through the multiplication operation of the motor torque and the steering torque, and the yaw rate change rate condition are all met (S260), it may be determined that the MDPS breaks down (S270).

Figure 7:
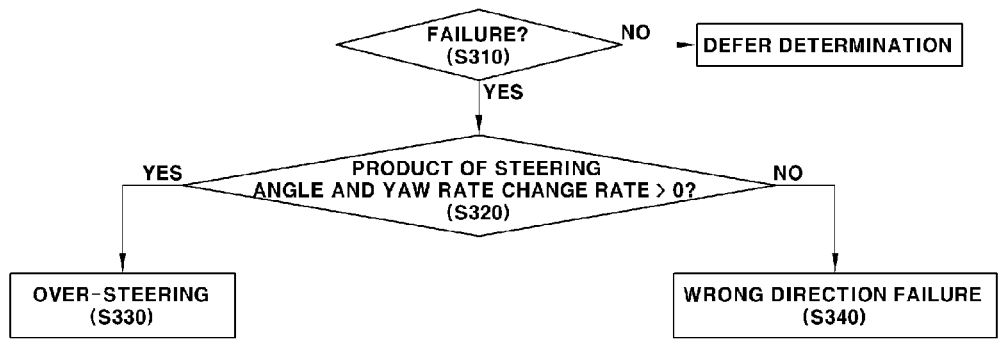
FIG. 7 is a flowchart illustrating a process of determining the type of failure when an MDPS is determined to break down.

FIG. 7 is a flowchart illustrating a process of determining the type of failure when the MDPS is determined to break down.

As shown in FIG. 7, it may be determined whether or not the MDPS breaks down (S310). When it is determined that the MDPS breaks down, the product of the steering angle and the yaw rate change rate may be calculated, and the sign of the calculated value may be determined (S320).

When the sign of the calculated value is positive, it may be determined that the failure of the MDPS is over-steering (S330). On the other hand, when the sign of the calculated value is negative, it may be determined that the failure of the MDPS is wrong direction (S340).

However, when it is determined that the MDPS does not break down, the determination of the type of MDPS failure may be deferred.

As described above, a failure detection apparatus and method of the MDPS according to an exemplary embodiment of the present invention has the following effects.

First, it is possible to deal with an emergency situation by effectively detecting the failure of the MDPS.

Second, the present invention has an effect capable of performing a fail-safe function without adding a separate function to the MDPS, by determining phenomenologically the whole state of a vehicle and determining whether the MDPS breaks down.

Third, it is possible to manually operate the MDPS by blocking a current applied to a motor of the MDPS when a failure of the MDPS is detected.

Fourth, the MDPS can be correctly operated, by blocking a current applied to the motor of the MDPS and simultaneously resetting and restarting the MDPS when a failure of the MDPS is detected.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A failure detection method of a Motor Drive Power System (MDPS), comprising:
    determining, by an electronic control unit (ECU) whether or not a vehicle speed is equal to or larger than a first preset value when a vehicle turns;
    performing, by the ECU, multiplication operation of a steering torque and a motor torque and determining whether or not an accumulation value determined by an integral for a preset time is equal to or larger than a second preset value when the vehicle speed is equal to or larger than the first preset value;
    determining, by the ECU, whether or not the motor torque is equal to or larger than a third preset value;
    determining, by the ECU, a yaw rate change rate according to the vehicle speed and a steering angle and determining whether or not the yaw rate change rate is equal to or larger than a fourth preset value; and
    determining, by the ECU, that the MDPS breaks down when the accumulation value is equal to or larger than the second preset value and the motor torque is equal to or larger than the third preset value and the yaw rate change rate is equal to or larger than the fourth preset value, and
    determining, by the ECU, that the MDPS normally operates when the accumulation value is not equal to or larger than the second preset value or the motor torque is not equal to or larger than the third preset value, or the yaw rate change rate is not equal to or larger than the fourth preset value,
    when it is determined that the MDPS breaks down, further comprising determining a type of failure, wherein the determining of the type of the failure includes:
        determining whether or not the signs of the steering angle and the yaw rate change rate are equal to each other; and
        determining that the failure of the MDPS is over-steering when the signs of the steering angle and the yaw rate change rate are equal to each other, and
        determining that the failure of the MDPS is wrong direction when the signs of the steering angle and the yaw rate change rate are not equal to each other.

2. The failure detection method of claim 1, when it is determined that the MDPS breaks down, further comprising blocking a current applied to a motor of the MDPS.

3. The failure detection method of claim 2, after the blocking of the current applied to the motor, further comprising resetting and restarting the MDPS.

4. The failure detection method of claim 1, wherein the determining processes are sequentially repeated.

5. The failure detection method of claim 1, in the determining of whether or not the vehicle speed is equal to or larger than the first preset value, comprising determining turning of the vehicle using an input of the steering angle and the steering torque.

6. The failure detection method of claim 1, wherein the yaw rate change rate is determined by estimating a yaw rate based on the input of the steering angle and the vehicle speed, differentiating the estimated yaw rate and using a low pass filter.

7. A failure detection apparatus of a Motor Drive Power System (MDPS), comprising:
    a prerequisite determination module determining according to a steering torque of a vehicle and an input of a steering angle whether or not the vehicle turns, and when a vehicle speed is equal to or larger than a first preset value, transmitting an order of determining whether or not the MDPS breaks down; and
    a failure determination module, which is linked with the prerequisite determination module, receiving the order of determining whether or not the MDPS breaks down from the prerequisite determination module to determine whether or not the MDPS breaks down,
    wherein the failure determination module comprises:
    an integral-based detection module performing multiplication operation of the steering torque and a motor torque and determining whether or not an accumulation value determined by an integral for a preset time is equal to or larger than a second preset value;
    a motor torque-based detection module determining whether or not the motor torque is equal to or larger than a third preset value; and
    a yaw rate change rate-based detection module determining a yaw rate change rate according to the vehicle speed and the steering angle and determining whether or not the yaw rate change rate is equal to or larger than a fourth preset value wherein the each of the integral-based detection module, the motor torque-based detection module and the yaw rate change rate-based detection module is linked with the failure determination module, and determines that the MDPS breaks down when conditions of accumulation value of the integral-based detection module is equal to or larger than the second preset value, and the motor torque of the motor torque-based detection module is equal to or larger than the third preset value, and the yaw rate change rate of the yaw rate change rate-based detection module is not equal to or larger than the fourth preset value,
    when the failure determination module determines that the MDPS breaks down, further comprising a failure type determination module:

determining whether or not the signs of the steering angle and the yaw rate change rate are equal to each other;

determining that a failure of the MDPS is over-steering when the signs of the steering angle and the yaw rate change rate are equal to each other; and determining that the failure of the MDPS is wrong direction when the signs of the steering angle and the yaw rate change rate are not equal to each other.

8. The failure detection apparatus of claim 7, when the failure determination module determines that the MDPS breaks down, further comprising a motor control module blocking a current applied to a motor of the MDPS.

9. The failure detection apparatus of claim 8, when the motor control module blocks the current applied to the motor of the MDPS, resetting and restarting the MDPS.

10. The failure detection apparatus of claim 7, wherein the yaw rate change rate is determined by estimating a yaw rate based on the input of the steering angle and the vehicle speed, and by differentiating the estimated yaw rate to apply to a low pass filter.

* * * * *